United States Patent
Kwasniewicz et al.

(10) Patent No.: US 6,988,611 B2
(45) Date of Patent: Jan. 24, 2006

(54) PNEUMATICALLY ACTUATED BELTLESS CONVEYOR

(75) Inventors: Ron W. Kwasniewicz, Walled Lake, MI (US); Dennis Trestain, Mason, MI (US)

(73) Assignee: Magnetic Products, Inc., Highland, MI (US)

( * ) Notice: Subject to any disclaimer, the term of this patent is extended or adjusted under 35 U.S.C. 154(b) by 222 days.

(21) Appl. No.: 10/256,665

(22) Filed: Sep. 27, 2002

(65) Prior Publication Data

US 2004/0060803 A1   Apr. 1, 2004

(Under 37 CFR 1.47)

Related U.S. Application Data

(63) Continuation of application No. PCT/US01/11783, filed on Apr. 10, 2001.
(60) Provisional application No. 60/195,929, filed on Apr. 10, 2000.

(51) Int. Cl.
    *B65G 25/00*   (2006.01)

(52) U.S. Cl. .................................... 198/750.7

(58) Field of Classification Search .............. 198/750.7
    See application file for complete search history.

(56) References Cited

U.S. PATENT DOCUMENTS

| | | | |
|---|---|---|---|
| 1,343,648 A | | 6/1920 | Smith |
| 2,473,193 A | * | 6/1949 | Campion et al. ........ 198/750.7 |
| 3,712,472 A | | 1/1973 | Elliott ........................ 210/222 |
| 4,505,380 A | * | 3/1985 | McLemore et al. ...... 198/750.7 |
| 6,311,832 B1 | | 11/2001 | Kwasniewicz et al. ..... 198/619 |

* cited by examiner

*Primary Examiner*—Joseph Valenza
(74) *Attorney, Agent, or Firm*—Bliss McGlynn, P.C.

(57) ABSTRACT

A pneumatically actuated, beltless conveyor assembly includes a housing, a drive system supported by the housing and a transport tray also operatively supported by the housing. A drive system includes a seal-less pneumatic engine which acts to drive the transport tray in repeated, rectilinear fashion to advance materials supported on the transport tray in the direction of the length of the tray.

11 Claims, 5 Drawing Sheets

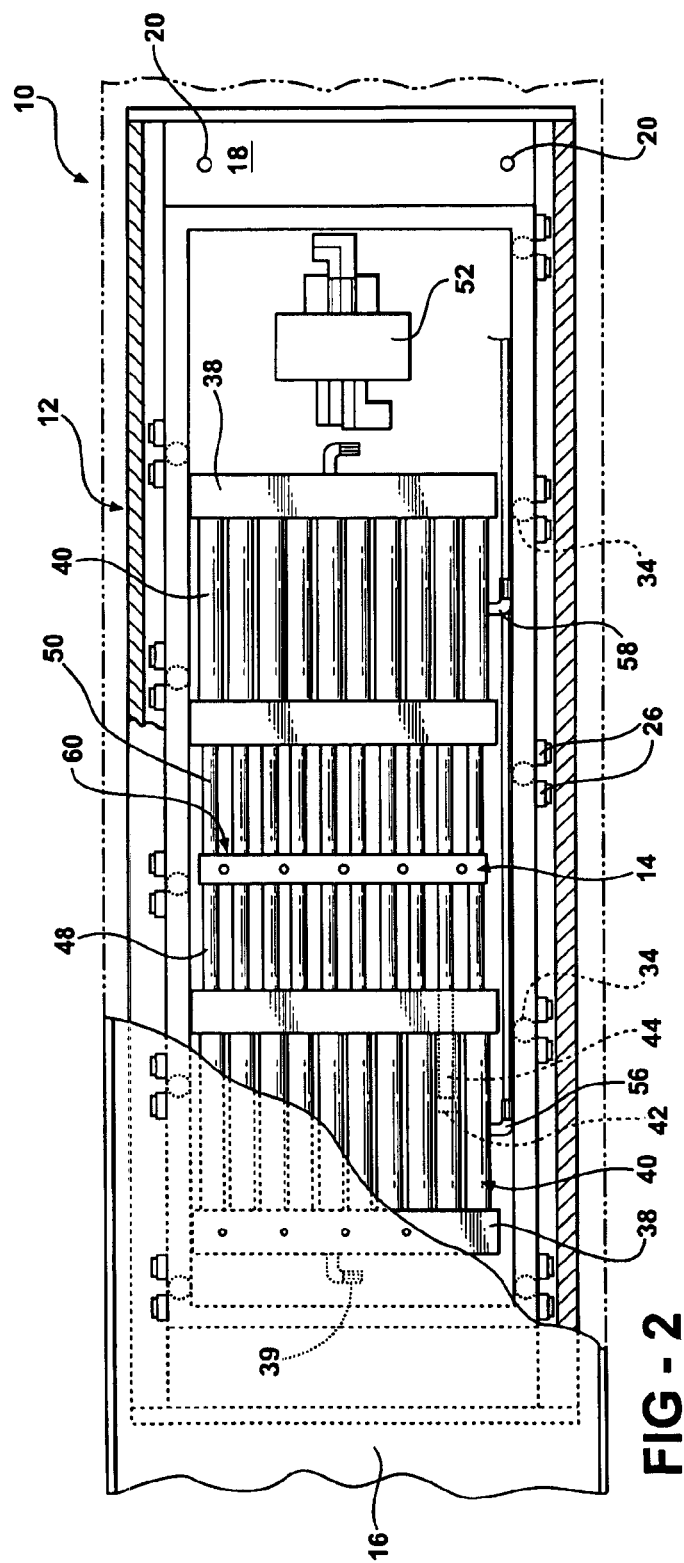
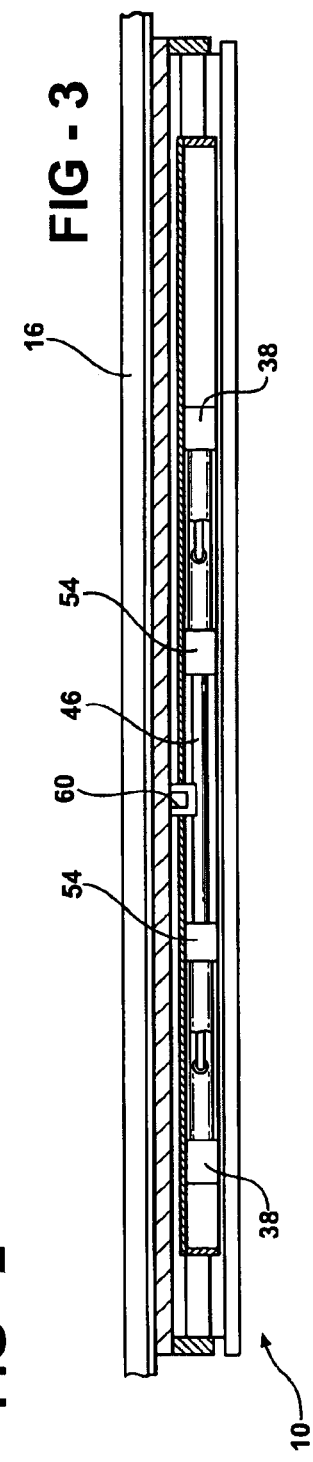

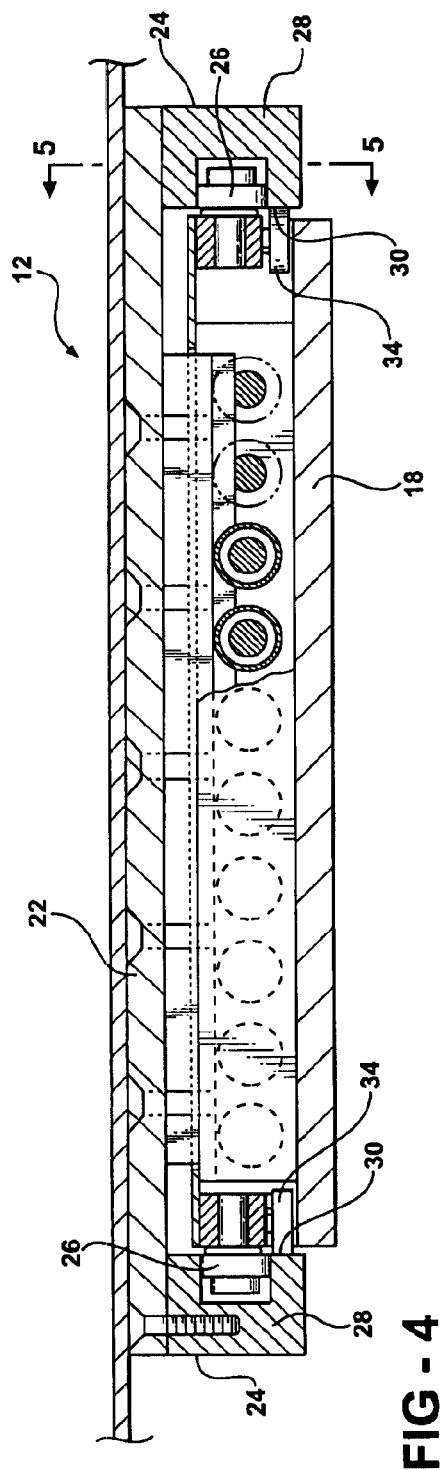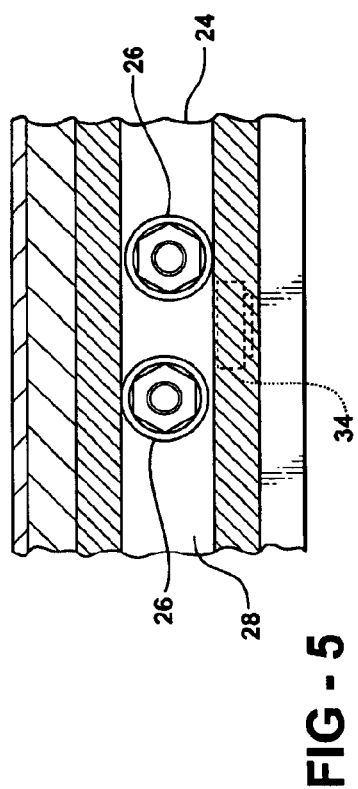
FIG-4
FIG-5

PNEUMATICALLY ACTUATED BELTLESS CONVEYOR

This application is a continuation of PCT Application No. PCT/US01/11783, filed Apr. 10, 2001, which claims priority from U.S. Provisional Application No. 60/195,929, filed Apr. 10, 2000.

BACKGROUND OF THE INVENTION

1. Field of the Invention

The present invention is directed toward beltless conveyors and, more specifically, to a pneumatically actuated beltless conveyor.

2. Description of the Related Art

Conveyors are well known material handling devices which have application in a wide variety of environments for transporting objects from one place to another. For example, one type of conveyor employs a belt formed into an endless loop which is entrained about at least a pair of rollers spaced apart from one another and usually located at the opposed marginal ends of the conveyor. The rollers have sprockets at either end thereof. The spaced rollers are interconnected by a pair of chains entrained about the sprockets at either end of the rollers. An electric or hydraulic motor is usually employed to power the sprockets and continuously moves the belt over a substantial length of the conveyor between the rollers. In this way, objects may be transported by the conveyor over its length.

Conveyors find application in manufacturing environments. For example, in metal stamping operations, conveyors are employed to move parts between successive presses or from a press into a bin. In addition, conveyors are used for inspecting, transporting and assembly situations and can assist in maximizing production by removing parts, slugs or other scrap and materials from under low clearance areas like punch press dies and permitting continuous operation of the press. However, belted conveyors suffer from the disadvantage that the belts are often cut by the sharp edges of the metal parts formed in stamping operations. The useful life of the belts are reduced and the belts must be replaced more frequently. Frequent belt replacement increases the maintenance costs of the stamping operation. Further, stamped parts and other debris may pass through the damaged belts and jam or foul the inner workings of the conveyor drive system.

In part to avoid these problems, beltless conveyors are often employed in certain manufacturing operations. One type of beltless conveyor known in the related art employs magnets to move ferromagnetic parts along the length of the conveyor. Metal parts are supported on a stainless steel or other non-magnetic slide surface. A plurality of strong magnets are movably supported at spaced increments beneath the non-magnetic slide surface along the length of the conveyor. The magnets cause the metal parts to be moved along the slide surface of the conveyor. Beltless magnetic conveyors obviously do not suffer from cuts or worn belts and thus have been adopted in numerous manufacturing environments. Water-tight beltless magnetic conveyors have even been submerged in coolant used in drilling, boring or other metal cutting operations. The magnetic conveyors clean the used coolant of metal or ferromagnetic contaminants so that the coolant may be recycled.

While magnetic conveyors have overcome significant problems associated with the belted conveyors of the related art, disadvantages still exist. Drive systems in both belted and magnetic beltless conveyors employ expensive and complex components. The complexity and expense of such drive systems has become a major factor in limiting the use of conveyors in industry today. Further, as the drive systems have become more complex, the risk that any given component may break, jam or fail has also increased. Conveyors presently employed in the related art are heavy pieces of machinery which are not often portable. In fact, after two to three years, magnetic conveyors are often discarded rather than reused in a different manufacturing line.

Thus, there remains a need in the art for a conveyor that is not susceptible to external damage from including, but not limited to, sharp edges of metal stampings, turnings, chips or parts, which at the same time, does not require a relatively complex drive system which is susceptible to internal damage caused by a failure of complex components. Further, there remains a need in the art for such a conveyor which presents a thin profile, is lightweight and which is also cost-effective.

Partly in response to this need, pneumatically actuated conveyors, commonly referred to as transporters, were developed in the related art. The pneumatic engines are typically mounted to a steel tray designed to convey or transport parts. When compressed air is fed into the transporter, reciprocating forward and reversing motion is created. A critical aspect of this conveying method is the control of the forward and reversing speed and motion cycle. Attaching a tray to this device allows materials to slide along the length of the tray parallel to the forward/reversing direction. This method of conveying materials provides a very cost competitive alternative to belted and magnetic beltless conveyors.

Transporters are very portable, lightweight, small in size and affordable. Trays attached to the transporter can be designed to fit a number of application requirements at a very inexpensive cost. This enables a single transporter to fit a variety of applications, as needs change by simply changing the tray attached to the transporter in applications such as tool changes on a metal stamping press.

Transporters presently employed in the related art utilize compressed air and air seals to operate the pneumatic engine movement. Control of the air in the transporter engine is critical to its effective conveying capability. If the air seal becomes worn or damaged, the transporter will fail to convey materials on the tray. Due to this disadvantage transporters presently employed in the related art are sold with replacement seal kits to maintain the proper control of forward and reversing speed and motion cycle. Replacing seals requires downtime of production process machinery and man-hour labor costs. These costs can often exceed the original cost of the transporter the first time a seal kit is required.

Thus, there continues to be a need in the art for a pneumatically actuated beltless conveyor which presents a thin profile, is lightweight, which does not require the replacement of its engine seals, but which is long lasting as well as cost-effective.

SUMMARY OF THE INVENTION

The present invention overcomes these disadvantages in the related art in a pneumatically actuated, beltless conveyor assembly including a housing, a drive system supported by the housing and a transport tray also operatively supported by the housing. The drive system includes a seal-less pneumatic engine which acts to drive the transport tray in repeated, rectilinear fashion to advance materials supported on the transport tray in the direction of the length of said tray. In this way, materials such as metal stampings, chips, turning as well as parts are advanced over the length of the conveyor until they are discharged. The repeated, rectilinear movement of the drive system, but at different forward and reverse speeds, moves material in the direction of the conveyor. No sprockets are required which greatly reduces the thickness of the conveyor. There is no heavy motor nor motor mounts required to drive the conveyor. In addition, the conveyor of the present invention is lightweight, thin, relatively inexpensive and is robust and efficient in operation.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a partially cut-away top view of one embodiment of the pneumatically actuated beltless conveyor of the present invention.

FIG. 3 is a cross-sectional side view of one embodiment of the pneumatically actuated beltless conveyor of the present invention;

FIG. 4 is a cross-sectional end view of the pneumatically actuated beltless conveyor illustrated in FIG. 3;

FIG. 5 is a partial cross-sectional side view taken substantially along lines 5—5 of FIG. 4;

DETAILED DESCRIPTION OF THE PREFERRED EMBODIMENT(S)

One embodiment of the pneumatically actuated beltless conveyor of the present invention is generally indicated at 10 in FIGS. 1 through 5, where like numerals are used to designate like structure throughout the drawings. The conveyor 10 may be employed in any number of applications and neither the preceding discussion nor the description of the invention which follows should be interpreted as limiting the present use of the invention.

Figure 1:
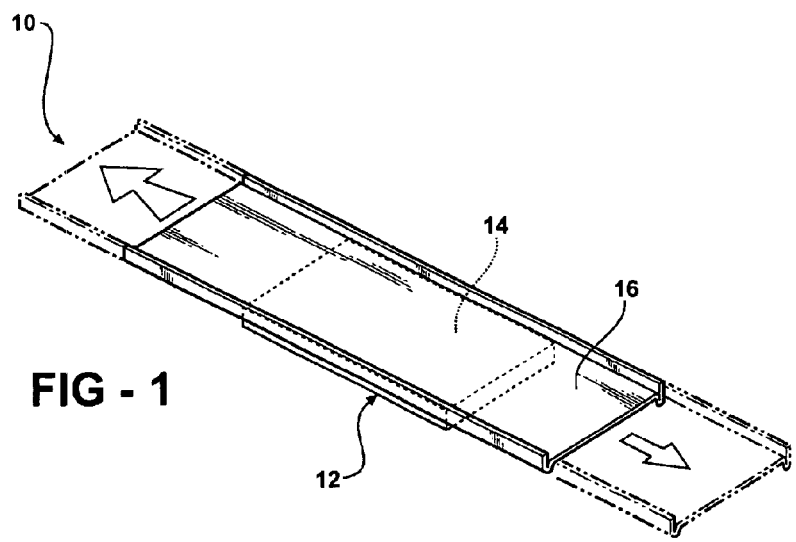
FIG. 1 is a perspective view of one embodiment of the pneumatically actuated beltless conveyor of the present invention.

Referring now to FIGS. 1 through 5, the conveyor 10 of the present invention includes a housing, generally indicated at 12 and a drive system, generally indicated at 14 which is supported by the housing 12. As best shown in FIGS. 1–3, a transport tray, also known as a rigidized shaker pan, generally indicated at 16, is operatively supported by the housing 12 as will be described in greater detail below. The drive system 14 includes a seal-less pneumatic engine which acts to impart repeated, rectilinear movement to the transport tray 16 so as to advance materials supported by the tray 16 in the direction of its longitudinal length.

Referring now to FIGS. 2–5, the housing 12 includes a bottom mount plate 18 which includes suitable apertures 20 and other structure (not shown) adapted to mount the conveyor assembly 10 into a press or any other environment in which the conveyor may be employed. In addition, the apertures 20 may be used to mount the drive system 14 within the housing 12.

A slider top plate 22 is movably supported relative to the bottom mount plate 18. To this end, the slider top plate 22 includes a pair of depending side tracks, generally indicated at 24 extending along a portion of the longitudinal length of the slider top plate 22. Each side track 24 is adapted to cooperate with a plurality of bearing clusters, generally indicated at 26, which support the slider top plate 22 relative to the bottom plate 18. More specifically, and as disclosed in the preferred embodiment illustrated in FIGS. 4 and 5, the side tracks 24 define a U-shaped track 28 and a rail 30. Each bearing cluster 26 includes one or more bearings 32 which are rotatable about a horizontal axis and received within the U-shaped tracks 28. The bearings 32 facilitate smooth movement of the slider top plate 22 without deviation in a direction transverse to the horizontal plane containing the axis of rotation of the bearings 32. Each bearing cluster 26 also includes one or more bearings 34 which are rotatable about a vertical axis and which rotatably engage the rail 30. The bearings 34 facilitate smooth movement of the slider top plate 22 without deviation in a direction transverse to the horizontal plane containing the axis of rotation of the bearings. Thus, the bearing clusters 26 cooperate with corresponding structure on the slider top plate 22 to ensure smooth, repeatable, rectilinear motion of the slider top plate 22 relative to the bottom plate 14.

One embodiment of the drive system 14 is generally illustrated in FIGS. 2–3. The drive system 14 of the present invention is, in essence, a seal-less, pneumatic engine which eliminates the need to lubricate the air used to power the engine as well as the need to replace seals which frequently wear out in other conveyors known in the related art. To this end, the drive system 14 includes a pair of end manifolds 38 and a plurality of cylinders 40 extending therebetween. Each end manifold 38 includes an air inlet 39 which is operatively connected to a source of pressurized air (not shown but commonly known in the art). Within each cylinder 40 there is supported a pair of bi-directional pistons 42, 44 and a push rod 46 extending therebetween. A push rod guide 48, 50, which in the preferred embodiment, may take the form a round Delrin ball, extends between the pistons 42, 44 and the push rods 46, respectively. A control valve 52 is employed to sequentially cycle pressurized air against alternating pistons 42, 44, so as to reciprocally move the pistons 42, 44 within the cylinders 40. Furthermore, the pressure applied to the pistons 42, 44 is controlled so that the movement in one direction, such as the direction of part movement on the conveyor 10, is relatively slow and so that movement in the opposite direction is relatively fast. A pair of center manifolds 54 span the transverse width of the plurality of cylinders 40 and are located between the pair of pistons 42, 44 to vent cylinder air to the atmosphere.

At least one of the cylinders 40 includes a pair of stroke control orifices 56, 58 disposed spaced relative to one another in the direction of the longitudinal length of the conveyor. Movement of a piston 42 past an associated orifice 56 signals the control valve 52 to reverse direction of the pressurized air to the opposite end manifold 38. This, in turn, reverses the direction of the movement of the pistons 42, 44. The similar, but opposite effect results when the piston 44 moves past the associated orifice 58. Thus, the drive system 14 of the present invention includes a seal-less pneumatic engine having a series of bi-directional pistons 42, 44 which are movable simultaneously within a plurality of adjacent cylinders 40, all of which are supported in a common plane.

The drive system 14 further includes a free-floating drive dog assembly, generally indicated at 60 in FIGS. 2 and 3. The drive dog assembly 60 includes fingers (not shown) which fit around ring grooves (also not shown) formed in the push rods 46 associated with the pistons 42, 44. The drive dog 60 is self-aligning and acts as a flexible link which interconnects the pneumatic engine to the transport tray 16 via the slider top plate 22. This flexible link acts to isolate the push rods 46 from vibrations which could otherwise be transmitted to the engine thereby causing stress and possibly premature failure.

The rhythmic, repeating, rectilinear movement of the engine is imparted to the transport tray 16 which is supported for movement with the slider top plate 22. The transport tray 16 may define any geometric shape and can be fabricated in a number of ways to fit the particular applications at hand. As illustrated in FIG. 1, the transport tray 16 has an elongated, rectangular shape with a pair of upstanding flanges 62 extending for a substantial portion of its longitudinal length.

The pneumatically actuated beltless conveyor of the present invention is inexpensive, lightweight and designed to handle small parts and materials such as metal stamping, chips and turnings. The transport tray 16 is moved in a repeated, rectilinear, rhythmic motion relatively slowly forward and then quickly backwards. This movement advances the material on the transport tray 22 in the direction of the forward movement of the transport tray. The pneumatically actuated beltless conveyor of the present invention employs a seal-less engine for its drive system thereby eliminating the need for lubricated air and replacement seals. The pneumatically actuated conveyor requires approximately 50–150 psi air supply to operate and includes an external regulator as well as a filter assembly for removing contaminate from the air supply. The present invention is easily and quickly mounted in a number of different applications and includes an adjustable speed control. It is lightweight and is easily moved from one location to another.

Figure 6:
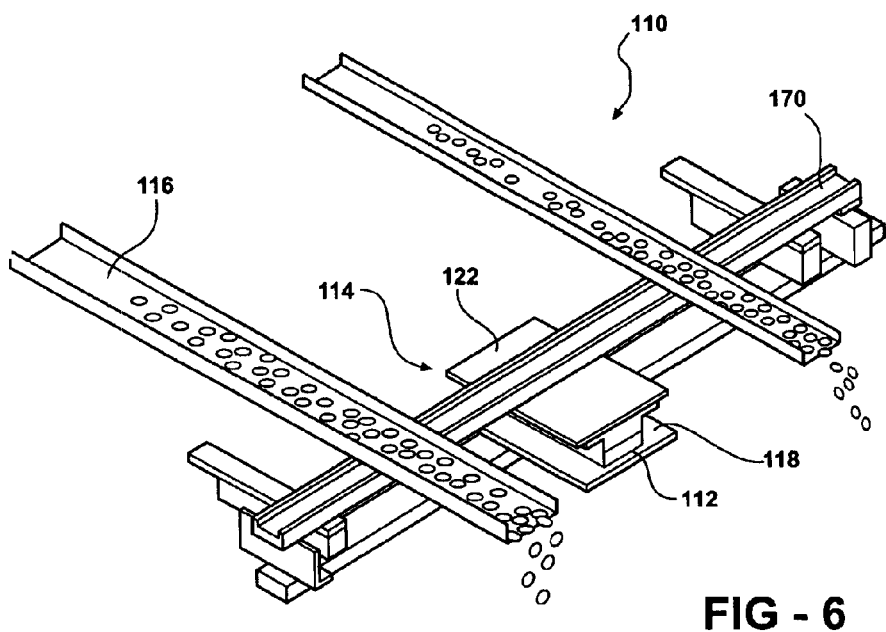
FIG. 6 is a perspective view of an alternate embodiment of the pneumatically actuated beltless conveyor of the present invention.
Figure 7:
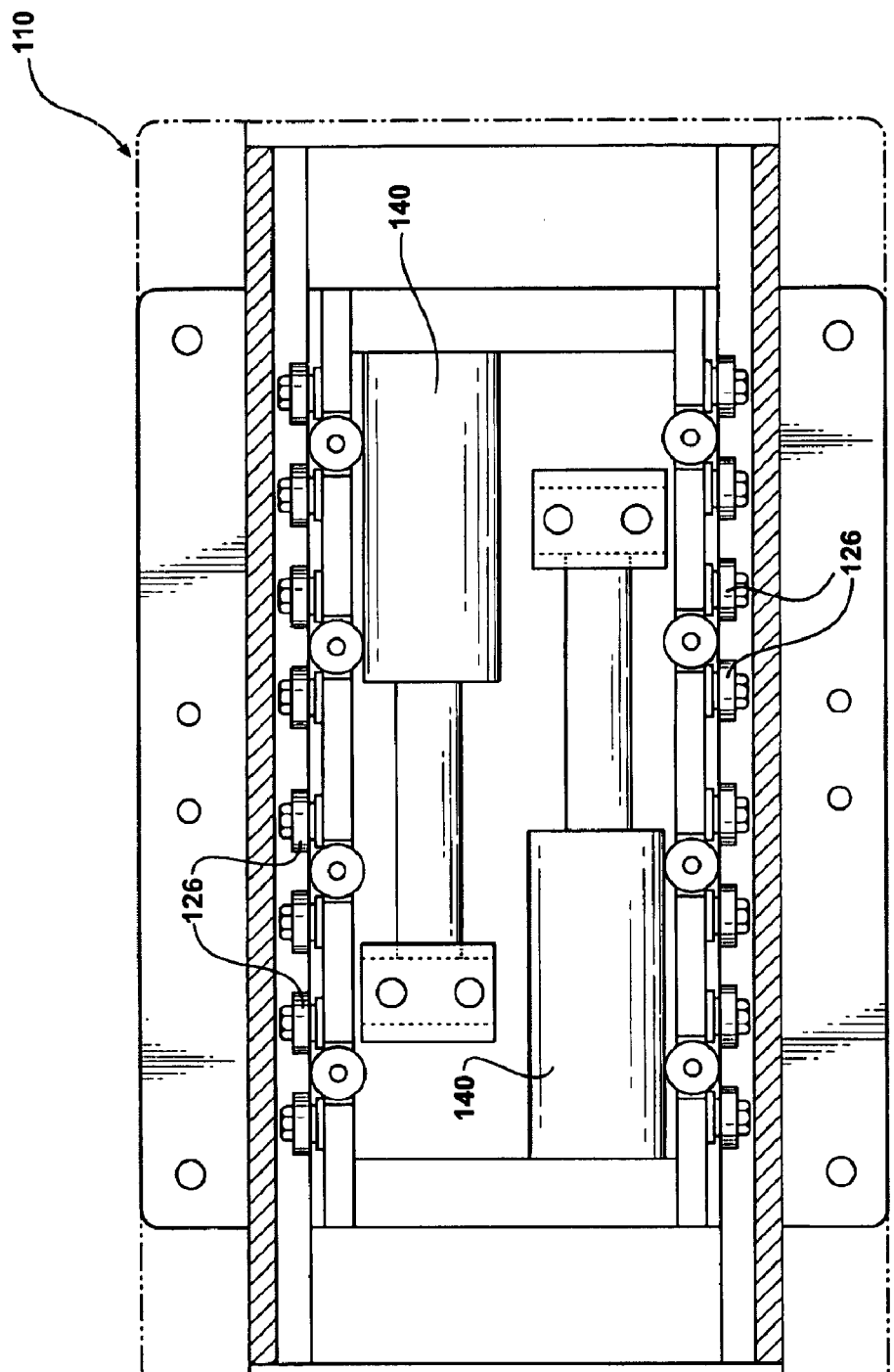
FIG. 7 is a top view of an alternate embodiment of the pneumatically actuated beltless conveyor of the present invention illustrating the drive system.
Figure 8:
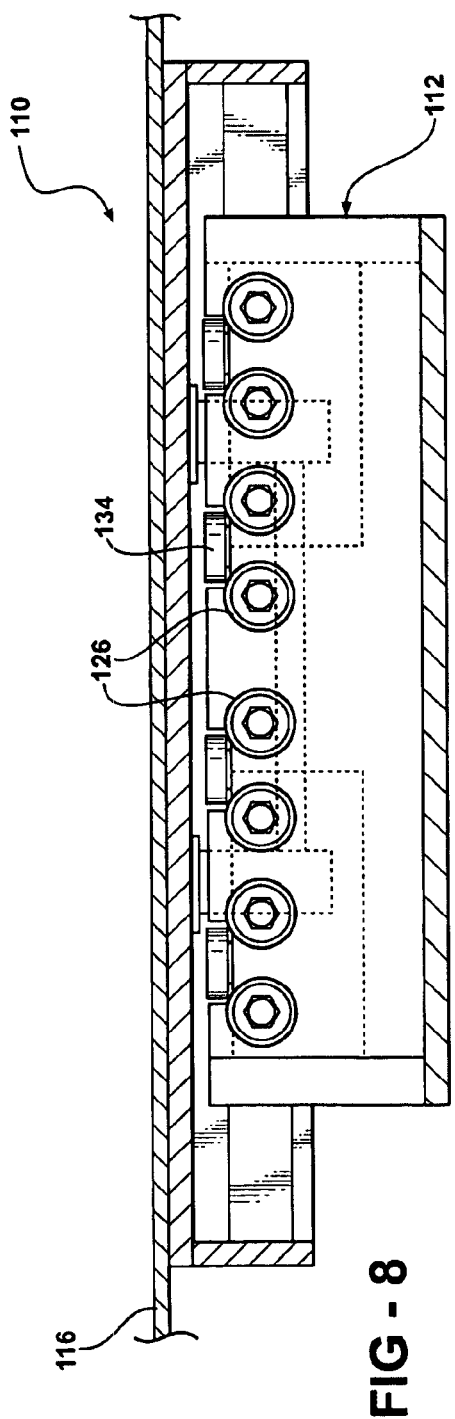
FIG. 8 is a cross-sectional side view of the pneumatically actuated beltless conveyor illustrated in FIG. 7.
Figure 9:
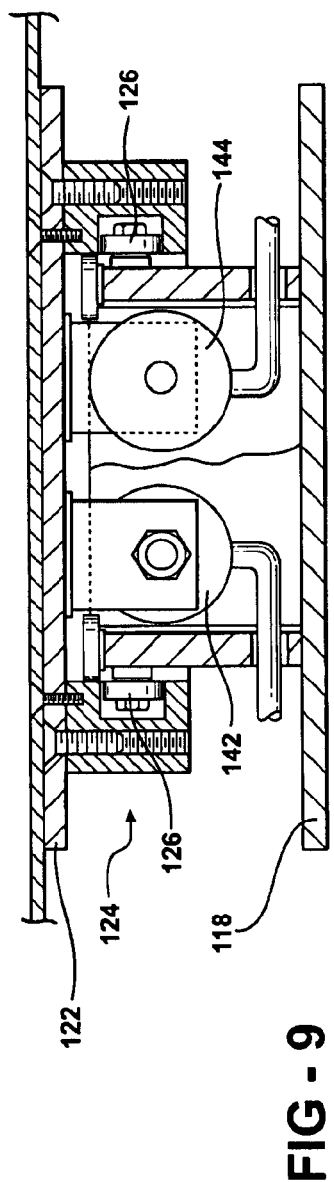
FIG. 9 is a cross-sectional end view of the pneumatically actuated beltless conveyor illustrated in FIG. 8.

An alternate embodiment of the present invention is illustrated in FIGS. 6–9 where like numerals increased by a factor of 100, are used to designate like structure. Thus, as with the conveyor 10 illustrated in FIGS. 1–5, the conveyor 110 illustrated in FIGS. 6–9 includes a housing 112, a drive system, generally indicated at 114 which is supported by the housing 112 and a transport tray, generally indicated at 116 which is operatively supported by the housing 112 for repeated, rectilinear, rhythmic motion as described above. However, and as best shown in FIG. 6, the conveyor 110 includes a pair of transport trays 116 which are mounted to a cross-member 170 which, in turn, is mounted to the slider top plate 122. In addition and as best shown in FIGS. 7 and 9, the drive system 114 employs a pair of staggered cylinders 140 within which are supported a pair of staggered pistons 142, 144. The use of staggered piston/cylinder arrangement facilitates a shorter length of the drive system 114. The larger pistons/cylinders when compared with those employed with the drive system 114 allow for greater power even though only a pair of pistons is employed. Each piston 142, 144 is used to power the unit in only one direction. Thus, the pistons 142, 144 are powered in opposed directions. Furthermore, the push rods employed in the drive system 114 of the conveyor 110 are directly connected to the slider top plate 122.

The conveyor 110 enjoys all of the advantages as described in connection with the conveyor 10 and is illustrated to show the acceptable variations of the present invention within the scope of the description set forth herein.

The invention has been described in an illustrative manner. It is to be understood that the terminology which has been used is intended to be in the nature of words of description rather than of limitation. Those having ordinary skill in the art will appreciate that many modifications and variations of the invention are possible in light of the above teachings. Therefore, within the scope of the appended claim, the invention may be practiced other than as specifically described.

We claim:

1. A pneumatically actuated, beltless conveyor assembly comprising:

a housing, a drive system supported by said housing and at least one transport tray supported by said housing and operatively connected to said drive system, said housing including a bottom plate, a slider top plate operatively connected to said drive system with said transport tray operatively connected to said slider top plate;

said drive system including a seal-less pneumatic engine, and a control valve operating to sequentially cycle pressurized air to alternating ends of said seal-less pneumatic engine so as to drive said transport tray in repeated, rectilinear fashion through movement in one direction at a first predetermined slower speed to advance materials supported on said transport tray in the direction of the length of said tray and movement in a second direction opposite to said first direction at a second predetermined speed that is greater than the first predetermined speed such that the transport tray moves relative to the material supported thereon.

2. A pneumatically actuated beltless conveyor assembly as set forth in claim 1 wherein said drive system further includes a pair of end manifolds and said seal-less pneumatic engine includes a plurality of cylinders extending therebetween, each manifold including an air inlet that is operatively connected to a source of pressurized air, said pair of end manifolds providing fluid communication between the source of pressurized air and said plurality of cylinders at either end thereof.

3. A pneumatically actuated beltless conveyor assembly as set forth in claim 2 wherein said seal-less pneumatic engine further includes a pair of opposed, seal-less bi-directional pistons supported within each cylinder for repeated rectilinear movement within said cylinder in response to pneumatic pressure alternatingly applied to each one of said pair of bi-directional pistons.

4. A pneumatically actuated beltless conveyor assembly as set forth in claim 3 wherein said seal-less pneumatic engine further includes a piston rod extending between each one of said pair of opposed, seal-less bi-directional pistons to operatively interconnect same.

5. A pneumatically actuated beltless conveyor assembly as set forth in claim 2 wherein at least one of said plurality of cylinders includes a pair of stroke control orifices disposed in spaced relationship to one another such that movement of a respective piston of said pair of opposed bi-directional pistons supported in said at least one cylinder past an associated stroke control orifice generates a signal to said control valve to reverse direction of the pressurized air to the opposite end of said plurality of cylinders thereby reversing the direction of movement of each pair of opposed bi-directional pistons supported in said plurality of cylinders as well as said transport tray.

6. A pneumatically actuated beltless conveyor assembly as set forth in claim 3 wherein said drive system further includes a pair of center manifolds extending transversely relative to the longitudinal axis defined by the plurality of cylinders and substantially across the width thereof and between said pair of opposed bi-directional seal-less pistons, said center manifold adapted to vent air from said plurality of cylinders.

7. A pneumatically actuated beltless conveyor assembly as set forth in claim 1 wherein said drive system further includes a free floating dog drive that acts as a flexible link to interconnect said drive system and said transport tray.

8. A pneumatically actuated beltless conveyor assembly as set forth in claim 1 wherein said housing further includes a plurality of bearing clusters operatively supported by said housing and acting to support said slider top plate in such a way so as to provide repeatable, smooth rectilinear movement relative to said bottom plate.

9. A pneumatically actuated beltless conveyor assembly as set forth in claim 8 wherein said slider top plate includes a pair of depending side tracks extending along a portion of the longitudinal length of said slider top plate, each of said pair of depending slide tracks defining a U-shaped track and a rail, each bearing cluster including at least one bearing that is rotatable about a horizontal axis extending substantially transverse to the direction of rectilinear movement of said slider top plate and adapted for rolling engagement relative to said U-shaped track and at least one bearing that is rotatable about a vertical axis extending substantially perpendicular to the plane defined by said slider top plate and adapted for rolling engagement relative to said rail.

10. A pneumatically actuated beltless conveyor assembly as set forth in claim 1 wherein said seal-less pneumatic engine includes a pair of opposed seal-less pneumatic piston cylinders wherein one of said pair of seal-less pneumatic piston cylinders acts to drive said transport tray in one direction at a first predetermined slower speed to advance materials supported on said transport tray in the direction of the length of said tray and the other one of said pair of seal-less pneumatic piston cylinders acts to drive said transport tray in a second direction opposite to said first direction at a second predetermined speed that is greater than the first predetermined speed such that the transport tray moves relative to the materials supported thereon.

11. A pneumatically actuated beltless conveyor assembly as set forth in claim 1 further including a pair of transport trays operatively supported by said housing and connected to said drive system to drive said pair of transport trays in repeated rectilinear fashion.

* * * * *